(12) United States Patent
Knowles (10) Patent No.: US 6,519,622 B1
(45) Date of Patent: Feb. 11, 2003

(54) DESIGNING ADDITION CIRCUITS

(75) Inventor: Simon Knowles, Bath (GB)

(73) Assignee: STMicroelectronics Limited, Bristol (GB)

( * ) Notice: Subject to any disclaimer, the term of this patent is extended or adjusted under 35 U.S.C. 154(b) by 0 days.

(21) Appl. No.: 09/375,317

(22) Filed: Aug. 16, 1999

(30) Foreign Application Priority Data

Aug. 17, 1998 (GB) .............................. 9817899

(51) Int. Cl.⁷ ................................. G06F 7/50
(52) U.S. Cl. ...................................... 708/710
(58) Field of Search ............................ 708/706, 707, 708/710, 711

(56) References Cited

U.S. PATENT DOCUMENTS

| | | | |
|---|---|---|---|
| 5,047,974 A | 9/1991 | Young | 364/784 |
| 5,477,480 A | * 12/1995 | Inui | 708/711 |
| 5,777,491 A | 7/1998 | Hwang et al. | 326/113 |
| 5,881,274 A | * 3/1999 | Ngo et al. | 708/710 |
| 5,933,362 A | * 8/1999 | Inoue | 708/711 |
| 6,134,576 A | * 10/2000 | Hossain et al. | 708/710 |

FOREIGN PATENT DOCUMENTS

EP 0 707 262 A1 4/1996 ............ G06F/7/50

OTHER PUBLICATIONS

Kowalczuk et al., "A New Architecture For An Automatic Generation Of Fast Pipelined Adders," *ESSCIRC '91, Seventeenth European Solid State Circuits Conference*, pp. 101–104, Sep. 11–13, 1991.

Beaumont–Smith and Burgess, "A GaAs 32–Bit Adder," *13th IEEE Symposium on Computer Arithmetic*, pp. 10–17, Jul. 6–9, 1997.

* cited by examiner

*Primary Examiner*—Tan V. Mai
(74) *Attorney, Agent, or Firm*—Lisa K. Jorgenson; E. Russell Tarleton; Seed IP Law Group PLLC

(57) ABSTRACT

A method of designing an addition circuit, and an addition circuit designed according to the method are described. The design technique is optimised to facilitate design of an addition circuit of minimum depth. The design technique takes into account the number of logical stages of the addition circuit and the manner in which those stages are connected by spanning paths to create fan-out nodes. The number of fan-out nodes per level can be optimized. For bit lengths n, the number (m+2) of logical stages is $n=2^{m+1}$ and for bit lengths n not of a binary order, the number (m+2) of logical stages is $n_{b0}=2^{m+1}$, where $n_{b0}$ is the next largest binary order after n.

14 Claims, 9 Drawing Sheets

PRIOR ART

DESIGNING ADDITION CIRCUITS

FIELD OF THE INVENTION

The present invention relates to addition circuits for adding a binary number A to a binary number B, and more particularly but not exclusively to addition circuits designed to meet particular process or application criteria.

BACKGROUND OF THE INVENTION

Figure 1:
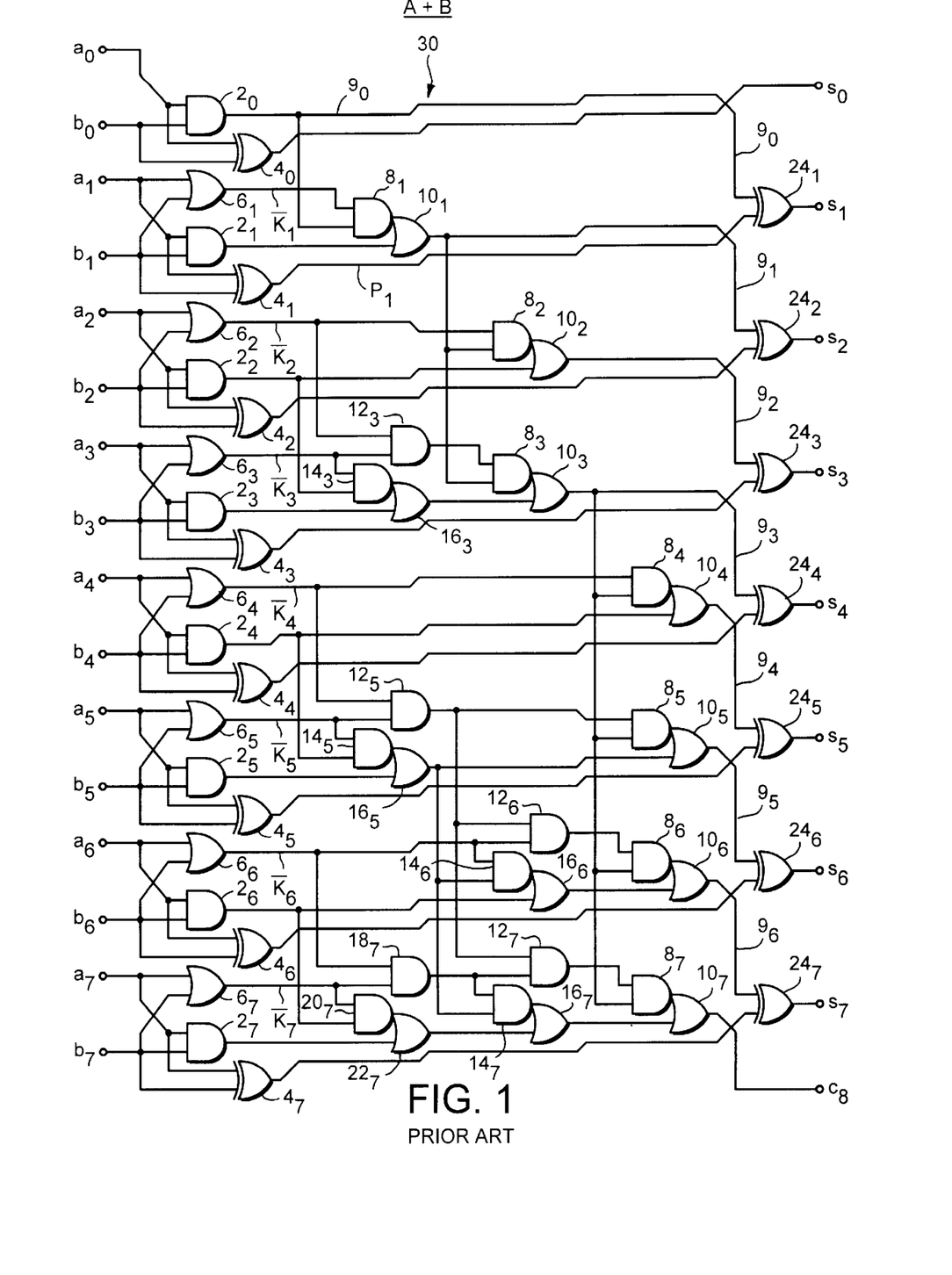
FIG. 1 illustrates prior art circuitry for producing A+B in more detail.

A variety of different addition circuits are known. One basic example is illustrated in FIG. 1. The binary number A is represented as a series of bits $a_i$ where i is the binary weight of the bit $a_i$ and increases from the value zero for the least significant bit of A in steps of one to the value of the most significant bit of A. The binary number B is a series of bits $b_i$ where i is the binary weight of the bit. The summation of the numbers A and B is represented by the binary number S which is a series of bits $s_i$ where i is the binary weight of the bit, and $C_8$ which is the msb of the sum.

The bit $a_0$ and the bit $b_0$ are supplied as inputs to an AND gate $2_0$ which produces the bit generate $g_0$. The bit $a_0$ and the bit $b_0$ are also supplied as inputs to an XOR gate $4_0$ which produces $s_0$ as its output. The bit $a_1$ and the bit $b_1$ are supplied as inputs to an XOR gate $4_1$ which produces the first bit propagate signal $p_1$. The bit generate signal $g_0$ and the first bit propagate signal $p_1$ are supplied as inputs to an XOR gate $24_1$ which produces the bit $s_1$. The bit $a_1$ and the bit $b_1$ are also supplied as inputs to an OR gate $6_1$ which supplies its output as a first input to an AND gate $8_1$. The second input of the AND gate $8_1$ is received from the output of the AND gate $2_0$. The output of the AND gate $8_1$ provides a first input to an OR gate $10_1$. The second input to the OR gate $10_1$ is received from an AND gate $2_1$ which receives as inputs the bit $a_1$ and the bit $b_1$. The bit $a_2$ and the bit $b_2$ are supplied as inputs to an XOR gate $4_2$ which provides its output as a first input to a XOR gate $24_2$. The second input to the XOR gate $24_2$ is provided by the output of the OR gate $10_1$. The output of the XOR gate $24_2$ provides the bit $s_2$. The bit $a_2$ and the bit $b_2$ are also combined in an OR gate $6_2$ to produce a first input to an AND gate $8_2$ which receives as a second input the output from the OR gate $10_1$.

The output from the AND gate $8_2$ supplied as a first input to a OR gate $10_2$. The second input to the OR gate $10_2$ is supplied by a AND gate $2_2$ which receives as an input the bits $a_2$ and $b_2$. The output of the OR gate $10_2$ is supplied as a first input to a XOR gate $24_3$. The second input to the XOR gate $24_3$ is supplied by the output of an XOR gate $4_3$ which receives as inputs the bit $a_3$ and the bit $b_3$. The output of the XOR gate $24_3$ provides the bit $s_3$. An AND gate $2_3$ also receives the bits $a_3$ and $b_3$ and provides its output as a first input to a OR gate $16_3$. The second input to the OR gate $16_3$ is provided by an AND gate $14_3$ which receives as a first input the output from the AND gate $2_2$ and as a second input the output from an OR gate $6_3$ which receives as inputs the bit $a_3$ and bit $b_3$. The output from the OR gate $6_3$ is also provided as a first input to an AND gate $12_3$ which receives as a second input the output from the OR gate $6_2$.

The output from the AND gate $12_3$ is supplied as a first input to an AND gate $8_3$ which receives as a second input the output from the OR gate $10_1$. The output from the AND gate $8_3$ and the output from the OR gate $16_3$ are combined in an OR gate $10_3$. A XOR gate $24_4$ receives as a first input the output from the OR gate $10_3$ and as a second input the output from an XOR gate $4_4$ which receives as inputs the bit $a_4$ and the bit $b_4$. The XOR gate $24_4$ produces the bit $s_4$.

An OR gate $6_4$ receives an inputs the bit $a_4$ and bit $b_4$ and provides its output as a first input to an AND gate $8_4$. The AND gate $8_4$ receives as its second input the output from the OR gate $10_3$ and provides its output to a OR gate $10_4$. The other input to the OR gate $10_4$ is provided by an AND gate $2_4$ which receives as inputs the bit $a_4$ and the bit $b_4$. An XOR gate $24_5$ produces the bit $s_5$ and receives as a first input the output from the OR gate $10_4$ and receives as a second input the output from an XOR gate $4_5$ which receives as inputs the bit as and the bit $b_5$. An AND gate $12_5$ receives as a first input the output from the OR gate $6_4$ and an output from an OR gate $6_5$ which receives as inputs the bit $a_5$ and the bit $b_5$.

An OR gate $16_5$ receives as a first input the output from an AND gate $2_5$ which receives as inputs the bit as and the bit $b_5$ and as a second input receives the output from an AND gate $14_5$ which itself receives as inputs the output from the AND gate $2_4$ and the output from the OR gate $6_5$. The output from the AND gate $12_5$ is combined with the output from the OR gate $10_3$ in an AND gate $8_5$ to produce a first input to a first OR gate $10_5$. The second input to the OR gate $10_5$ is provided by the output from the OR gate $16_5$.

The output from the OR gate $10_5$ is provided as a first input to the XOR gate $24_6$. The XOR gate $24_6$ receives as a second input the output from the XOR gate $4_6$ which receives as inputs the bit $a_6$ and the bit $b_6$. The XOR gate $24_6$ produces as an output the bit $s_6$.

An OR gate $6_6$ receives as its inputs the bit $a_6$ and the bit $b_6$ and supplies its output as a first input to an AND gate $12_6$. The second input to the AND gate $12_6$ is supplied by the output of the AND gate $12_5$ and the output of the AND gate $12_6$ is supplied as a first input to an AND gate $8_6$.

The output from the OR gate $6_6$ is supplied as a first input to an AND gate $14_6$. The AND gate $14_6$ receives as a second input the output from the OR gate $16_5$ and provides an output signal to a first input of an OR gate $16_6$. The second input to the OR gate $16_6$ is supplied by an AND gate $2_6$ which receives as inputs the bit $a_6$ and the bit $b_6$. The AND gate $8_6$ which receives as a first input the output from the AND gate $12_6$ receives as a second input the output from the OR gate $10_3$ and provides its output as a first input to an OR gate $10_6$. The second input to the OR gate $10_6$ is provided by the output of the OR gate $16_6$.

The output of the OR gate $10_6$ is provided as a first input to an XOR gate $24_7$. The XOR gate $24_7$ receives as a second input the output from an XOR gate $4_7$ which receives as inputs the bit $a_7$ and the bit $b_7$. The XOR gate $24_7$ produces the bit $s_7$.

The bit $a_7$ and the bit $b_7$ are combined in an OR gate $6_7$ to produce a first input to an AND gate $18_7$ which receives as a second input the output from the OR gate $6_6$. The output from the OR gate $6_7$ is supplied as a first input to an AND gate $20_7$. The AND gate $20_7$ receives as a second input the output from the AND gate $2_6$. The output from the AND gate $20_7$ is supplied as a first input to an OR gate $22_7$. The second input to the OR gate $22_7$ is provided by a AND gate $2_7$ which receives as its inputs the bit signal a, and the bit signal $b_7$.

An AND gate $14_7$ receives as its inputs the output from the AND gate $18_7$ and the output from the OR gate $16_5$ and provides its output as a first input to an OR gate $16_7$. The second input to the OR gate $16_7$ is supplied by the output of the OR gate $22_7$. The output of the OR gate $16_7$ is provided as a first input to an OR gate $10_7$. An AND gate $12_7$ receives as its inputs the output from the AND gate $12_7$ and the output from the AND gate $18_7$. The output from the AND gate $12_7$ is supplied as a first input to the AND gate $8_7$. The AND gate $8_7$ receives as a second input the output from the OR gate $10_3$. The output from the AND gate $8_7$ is supplied as a second input to the OR gate $10_7$. The output of the OR gate $10_7$ produces the last carry value $c_8$.

An addition circuit that can quickly change between producing an output value A+B and output value A+B+1 or that can simultaneously provide an output value A+B and an output value A+B+1 is described in an earlier GB patent application No. 9813328.3.

The addition circuitry described in that application has a plurality of addition paths, with each addition path having inputs for receiving respectively bits $a_i$, $b_i$ of the first and second binary numbers and output means for producing respectively bits $s_i$, $s'_i$ of third (A+B) and fourth (A+B+1) binary numbers.

By modification to the output means, the circuit can be configured to provide a number of different useful outputs, such as A+B or A+B+1; A+B and A+B+1; A−B and B−A; A−B or B−A; and modulus A−B. Thus, the circuit has a number of different useful applications.

Each addition path has a number of logical nodes in the depth direction of the circuit (input to output). Each set of nodes arranged widthwise of the circuit (that is in the direction of bit significance) forms a logical stage. Each adjacent pair of addition paths defines a column. An addition circuit of so-called "minimum depth" has the minimum number of logical stages which are required to add together the binary numbers according to their length n. Clearly, the greater the length n of binary numbers to be added, the higher is the number of stages even in a "minimum depth" circuit.

In developing a minimum depth circuit, clearly constraints are imposed on how the logical nodes can be interconnected. In GB Application No. 9813328.3, the circuit is designed so that each logical node is connected to as many logical nodes in the subsequent logical stage as possible. This connection is made via the addition path for the node and by one or more spanning path which crosses at least one column. The number of nodes in a subsequent stage to which a node of the preceding logical stage is connected by spanning paths is termed herein "fan-out".

Thus, the circuit of the earlier application is designed with so-called maximum fan-out. This has the advantage of minimising the number of wires that are required to make the circuit, but has the disadvantage that delays between logical states are incurred as a result of the capacitance introduced by the large number of gates connected to particular wires, particularly in the later logical stages.

Another possibility is to interconnect a node of a logical stage to a unique single node of a subsequent stage, which has the advantage of reducing fan-out (to a fan-out of 1), but the disadvantage of requiring a large number of wires which increases the space requirement for the circuit.

SUMMARY OF THE INVENTION

It is desirable to be able to design an addition circuit to accommodate a number of different process and application criteria. In particular, it is desirable to facilitate the process of designing an addition circuit of minimum depth.

According to the invention there is provided an addition circuit for adding together two operands, for example, two binary numbers (A,B), each having a length of n bits. The circuit includes an array of logical nodes that are arranged so that each set of logical nodes extending widthwise of the circuit form a logical stage and each set of nodes extending depthwise of the circuits form an addition path, with each pair of adjacent addition paths forming a column. Spanning paths are arranged to interconnect selected logical nodes so that adjacent logical stages are connected via an interconnection level, each spanning path extending from a node in one stage across at least one column and being connected to a number f of fan-out nodes in a subsequent stage.

The circuit has one or more of the following configuration parameters:
i) for each interconnection level the number f of fan-out nodes lies in the range 1 to $2^j$, where j is the interconnection level index lying between 0 and m, $2^j$ is the maximum fan-out number for that level, and there are m+2 logical stages;
ii) the fan-out f of nodes at each level is always no greater than the number f of fan-out nodes at a subsequent level;
iii) the number of columns across which a spanning path extends within an interconnection level is $2^j$; and
at least one level has a fan-out number $f<2^j$ and at least one level has a fan-out number $f>1$.

By defining a number of criteria for the addition circuit in terms of the configuration parameters referred to above, it is possible to design the addition circuit to suit the particular requirements at hand. That is, it allows designs to be constructed with fewer spanning wires and/or lower fan-out without significantly compromising speed requirements for a given circuit depth. The configuration parameters allow a number of design trade-offs to be considered each time resulting in an optimized addition circuit for the particular instant application.

The invention is particularly useful in the context of minimum depth addition circuits. For an addition circuit of minimum depth, the number (m+2) of logical stages is derived from the following equations:

$n=2^{m+1}$ (where n is a binary order), and $n_{b0}=2^{m+1}$ (where $n$ is not a binary order and where $n_{b0}$ is the next largest binary order after $n$).

In the described embodiment, each logical node comprises at least one logic gate that receives at least two signals representing bits of the same significance i in the binary numbers a, b to be added.

Each spanning path can convey one or more signals from a node of one significance in one logical stage to a node of a different significance in a subsequent logical stage.

Another aspect of the invention provides a method of designing an addition circuit for adding together two binary numbers (A,B) each of bit length n. The method includes:
determining the number (m+2) of logical stages in the addition circuit according to the following:
for bit length n of a binary order, $n=2^{m+1}$ and for bit lengths that are not binary orders $n_{b0}=2^{m+1}$ where $n_{b0}$ is the next largest binary order after n;
for each of said logical stages allocating a set of virtual nodes, the virtual nodes forming potential addition paths depthwise of the circuit and adjacent addition paths forming a column;
determining for each logical stage its expected input capacitance; and
defining spanning paths wherein the spanning paths constitute an interconnection level between adjacent logical stages, wherein definition of the spanning paths is carried out in accordance with the following configuration parameters and depending on the expected input capacitance of each stage:

i) for each interconnection level the number f of fan-out nodes in a subsequent stage to which a node of a preceding stage is connected lies in the range 1 to $2^j$, where j is the interconnection level index lying between 0 and m and $2^j$ is the maximum fan-out number for that level, ii) the fan-out f of nodes at each level is always no greater than the fan-out f of nodes at a subsequent level, iii) the number of columns across which a spanning path extends within an interconnection level is $2^j$, and     at least one level has a fan-out number $f<2^j$ and
    at least one level has a fan-out number $f>1$.

A number of different specific examples are possible. By way of illustration, the following particular examples are mentioned, but this is in no way a comprehensive list of all of the possible options.

An addition circuit wherein the fan-out f=1 for more than one level.

An addition circuit wherein f=1 for all levels except the mth level.

An addition circuit wherein at least one level has maximum fan-out f=2 where j is not equal to m.

An addition circuit where the fan-out f=2 for at least two levels.

For a better understanding of the present invention and to understand how the same may be brought into effect, reference will now be made by way of example only to the accompanying figures.

DETAILED DESCRIPTION OF THE INVENTION

Figure 2:
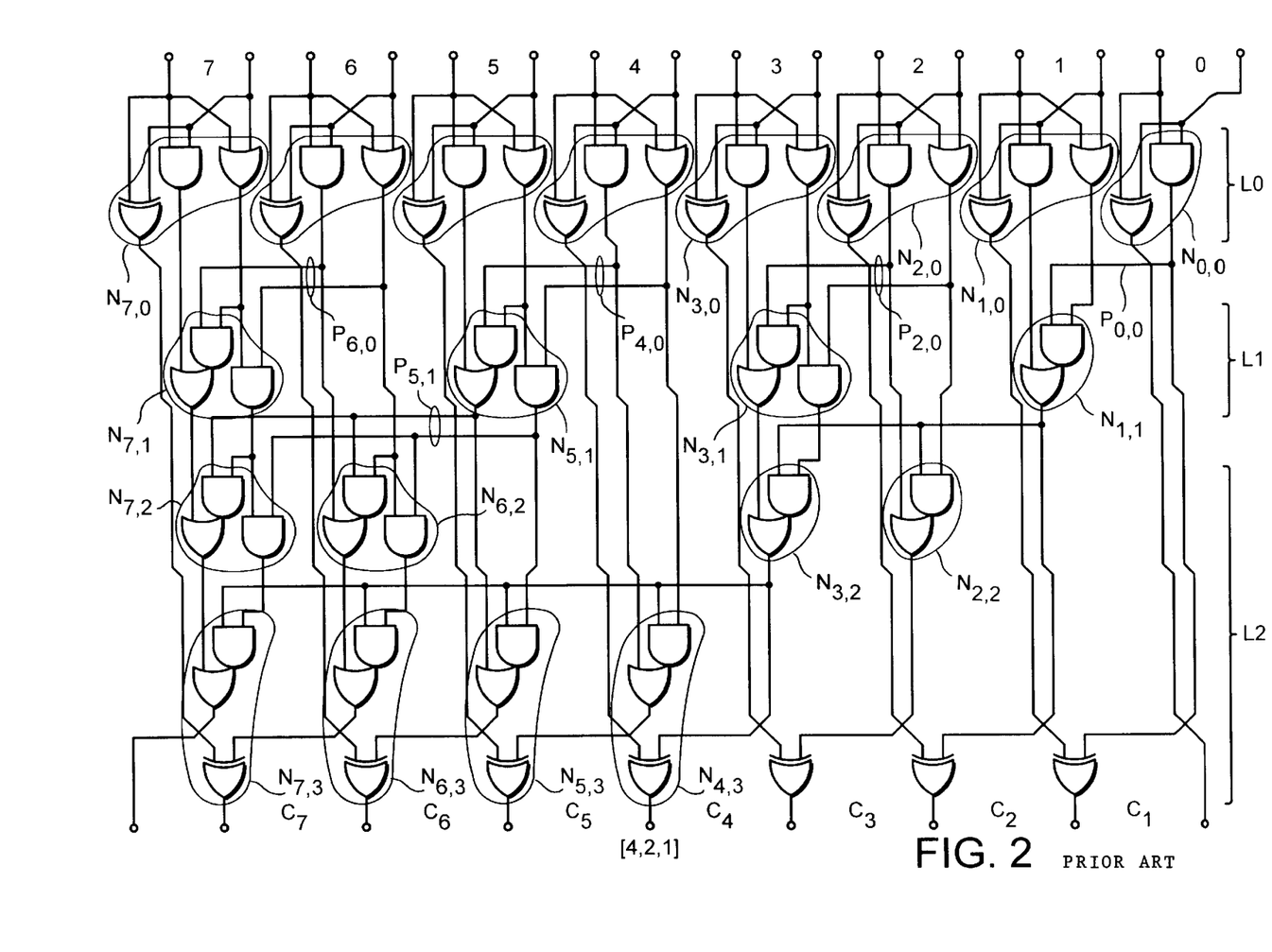
FIG. 2 illustrates the circuit of FIG. 1 but labelled to clearly denote the layout of the logical nodes.

Referring to FIG. 2, shown therein is the overall layout of the known addition circuit already illustrated in FIG. 1. The bit significance 0 . . . 7 is labelled for each addition path moving from the right hand side to the left hand side widthwise of the circuit of FIG. 2. The circuit has a plurality of logical nodes which are labelled according to the following notation:

$Ni,k$ where i is the bit significance of the node and k is an index defining the depth of the node within the addition circuit in a manner, which will become clearer in the following.

The nodes N are arranged so that each set of logical nodes extending widthwise of the circuit forms a logical stage. That is, the nodes N0,0 . . . N7,0 form logical stage k=0, the nodes N1,1, N3,1, N5,1 and N7,1 form the logical stage k=1; the nodes N2,2, N3,2, N6,2, N7,2 form the logical stage k=2; and the nodes N4,3 . . . N7,3 form logical stage k=3.

Depthwise of the circuit, each set of nodes forms an addition path. Each pair of adjacent addition paths constitutes a column labelled C1 to C7 in FIG. 2. The logical stages are interconnected by interconnection levels which are marked L0 to L2 in FIG. 2. Each interconnection level L0 to L3 comprises a number of spanning paths that are wires connecting a node N in a preceding stage to one or more nodes in a subsequent stage. Each spanning path can extend across one or more columns and comprise one or more wires for transferring one or more signals. In FIG. 2, the interconnection level L0 has spanning paths P0,0, P2,0, P4,0 and P6,0. P0,0 conveys a single signal from bit significance 0 to bit significance 1 across column C1. P2,0 conveys two signals from bit significance 2 to bit significance 3 across column 3. Similarly P4,0 and P6,0 each convey two signals across a single column.

The spanning paths in level 1, P1,1 and P5,1 respectively cross two columns. Also, they connect the node of stage 1 to two nodes of stage 2. The number of nodes in a subsequent stage to which a node of a preceding stage is connected by spanning paths is termed herein "fan-out". Of course, there are also a number of connections between nodes vertically along an addition path. Thus, the interconnection level L1 has a fan-out of 2. Applying the same principles, it can be seen that the interconnection level L2 has a fan-out of 4, connecting the node N3,2 in stage 2 to each of the four nodes N4,3 . . . N7,3 in stage 3.

The composition of each node in terms of its logical gates and the function of those logical gates can be seen by comparing FIG. 2 with FIG. 1. For example, the node N2,0 comprises the two logic gates $6_2$ and $2_2$. As another example, the node N5,1 comprises the three logic gates $12_5$, $14_5$ and $16_5$. It will be appreciated that the nodes of the first stage each include an Exclusive OR gate $4_0$ . . . $4_7$, and that the nodes of the first stage each include an Exclusive OR gate $24_0$ . . . $24_7$.

Figure 3A:
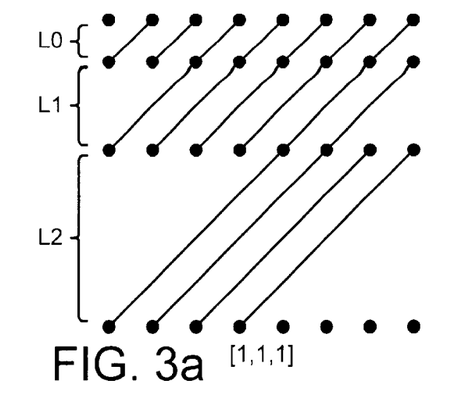
FIGS. 3a to 3e are node diagrams for addition circuits where n=8.
Figure 3B:
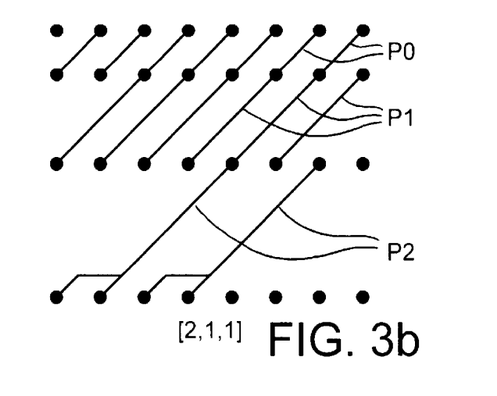
Figure 3C:
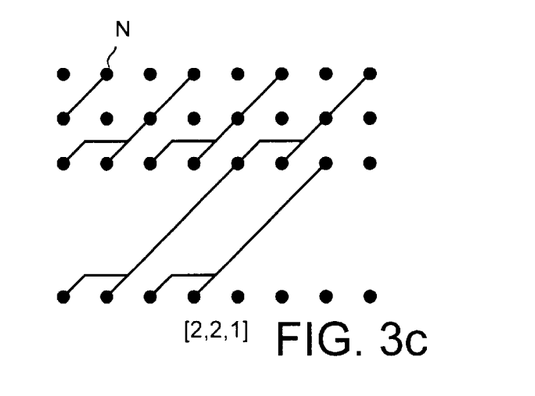
Figure 3D:
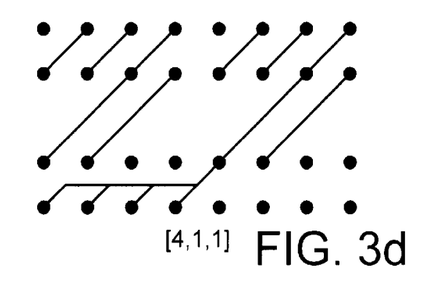
Figure 3E:
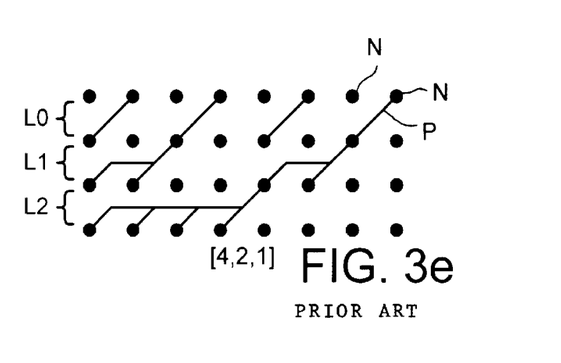

FIG. 3e illustrates a node diagram for the circuit of FIG. 2. In FIG. 3e, a complete array of eight by four "virtual" nodes is illustrated, each node being represented by a black dot. The spanning paths P are denoted by black lines. In the diagram of 3e, it is easier to see that the fan-out for interconnection level L0 is 1, the fan-out for interconnection level L1 is 2 and the fan-out for interconnection level L2 is 4. The circuit is therefore defined by the notation [4,2,1], which is the fan-out for each interconnection level, taking the lattermost interconnection level first.

As already mentioned, a problem that exists with this circuit is the high fan-out for the last and the next-to-the last level, which imposes signal delays through the interconnection levels. One way of avoiding this would be to construct a circuit along the lines illustrates in the node diagram of FIG. 3a. In that diagram, it can be readily seen that each interconnection level L0, L1 and L2 has a fan-out of 1. However, what is also clearly evident is the number of wires that are required to implement the circuit. It will be appreciated that the number of wires is related to the number of spanning paths P.

The inventor has determined that there are a number of other design options for a bit length of n=8 and a minimum depth addition circuit, which are illustrated in FIGS. 3b, 3c and 3d. In each of those figures, a complete array of eight by four "virtual" nodes is illustrated, each node N being represented by a black dot. Scanning paths P are denoted by a black line. The addition circuits of FIGS. 3b, 3c and 3d share the following characteristics.

i) For each interconnection level Lj, the number f of fan-out nodes lies in the range 1 to $2^j$. j denotes the interconnection level index.

In the addition circuits of FIGS. 3b, 3c and 3d, j is 0,1 or 2. $2^j$ is the maximum fan-out number for a particular level.

ii) The number f of fan-out nodes at each level is always no greater than the number f of fan-out nodes at a subsequent level.

Thus, in FIG. 3b the fan-out for levels L0 and L1 is 1, and the fan-out for level L2 is 2. In FIG. 3c the fan-out for level L0 is 1 and the fan out for levels L1 and L2 is 2. In FIG. 3d, the fan-out for levels L0 and L1 is 1, and the fan-out for level L2 is 4.

iii) The number of columns across which a spanning path extends within an interconnection level is $2^j$. Thus, for an eight bit adder as illustrated in FIGS. 3b, 3c and 3d the spanning paths P0 in level L0 cross one column, the spanning paths P1 in level L1 cross two columns, and the spanning paths P2 at level L2 cross four columns.

The addition circuits of FIGS. 3b, 3c and 3d also share the parameters that at least one level has a fan-out number less than its maximum, and at least one level has a fan-out number greater than one. By allowing these criteria to be varied, addition circuits can be designed in accordance with the required parameters of any particular application. Where space is an important consideration, the number of wires can be reduced by using increased fan-out at different levels. Where capacitive delays are a problem, these can be reduced by reducing fan-out where possible and increasing the number of levels where fan-out is less than its maximum.

Figure 4A:
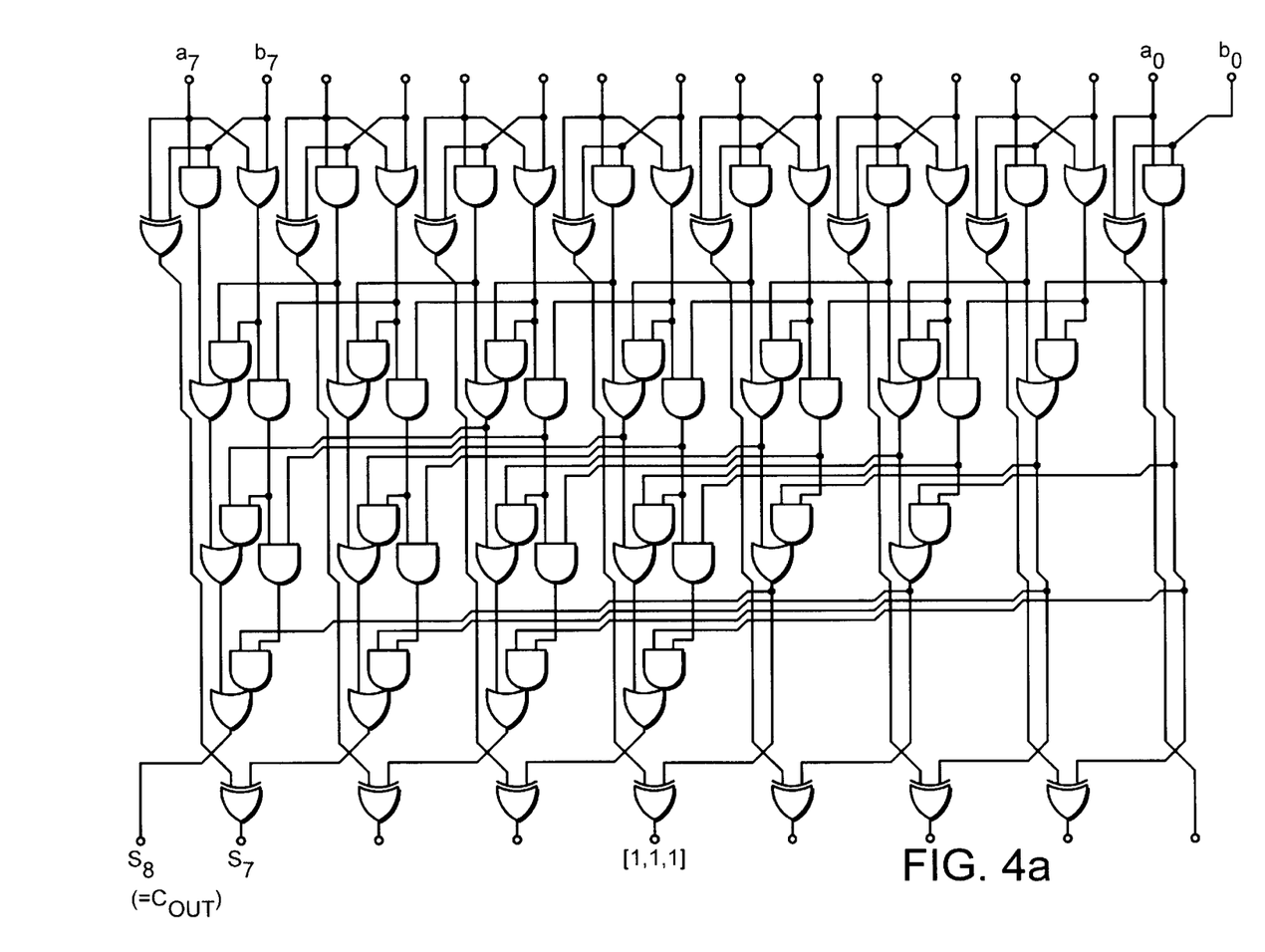
FIGS. 4a to 4d illustrates addition circuits implementing node diagrams of FIGS. 3a to 3d respectively.
Figure 4B:
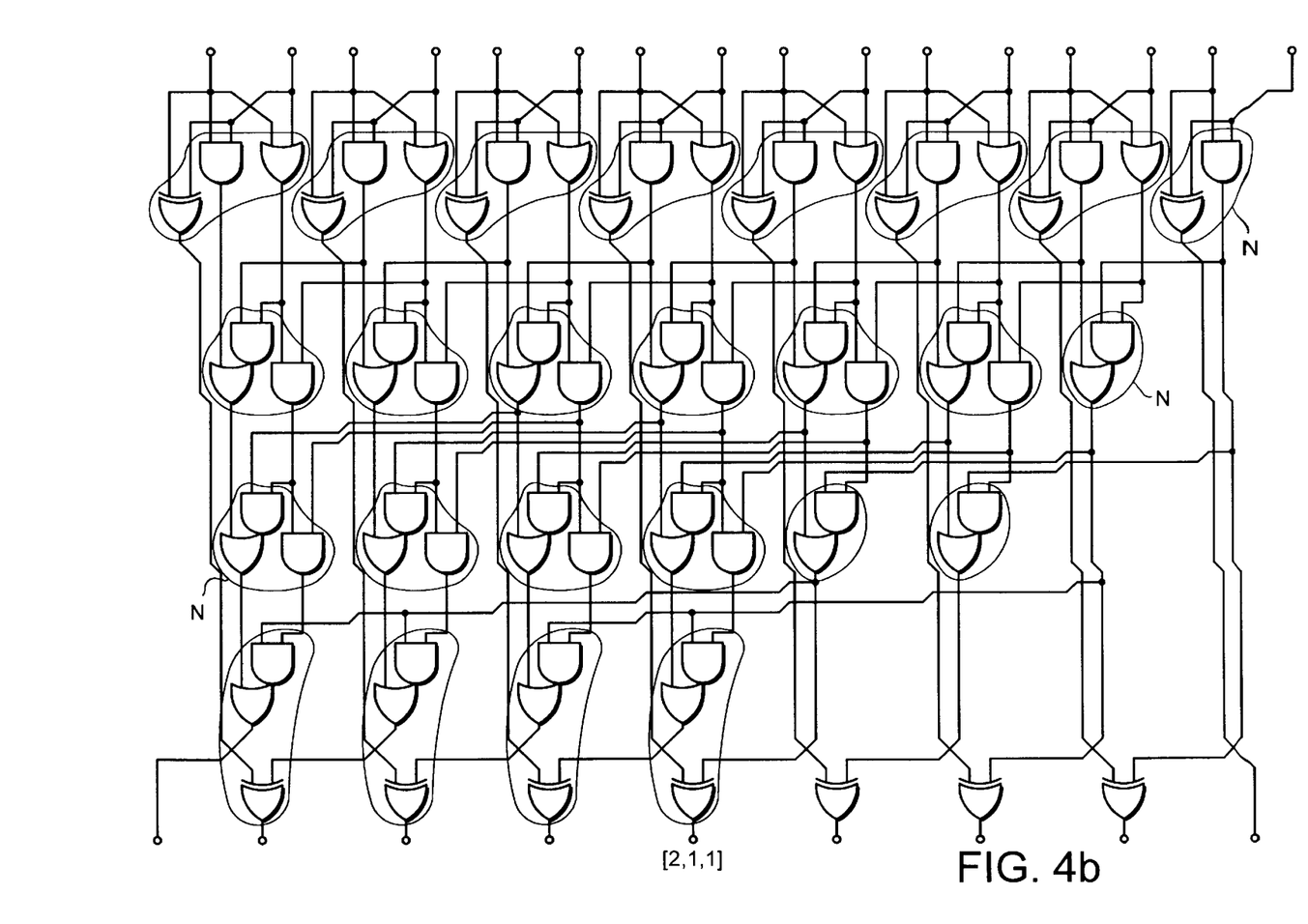
Figure 4C:
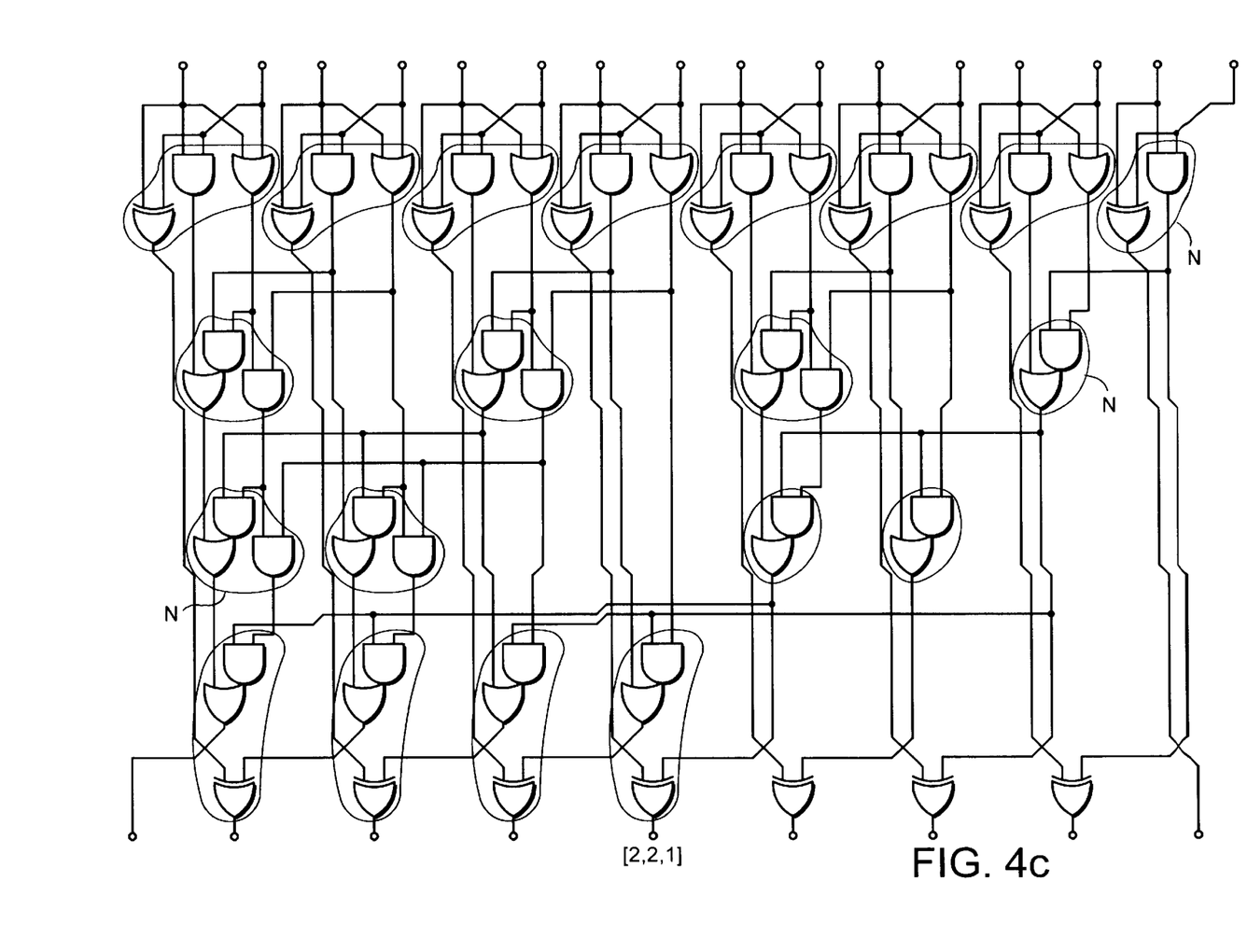
Figure 4D:
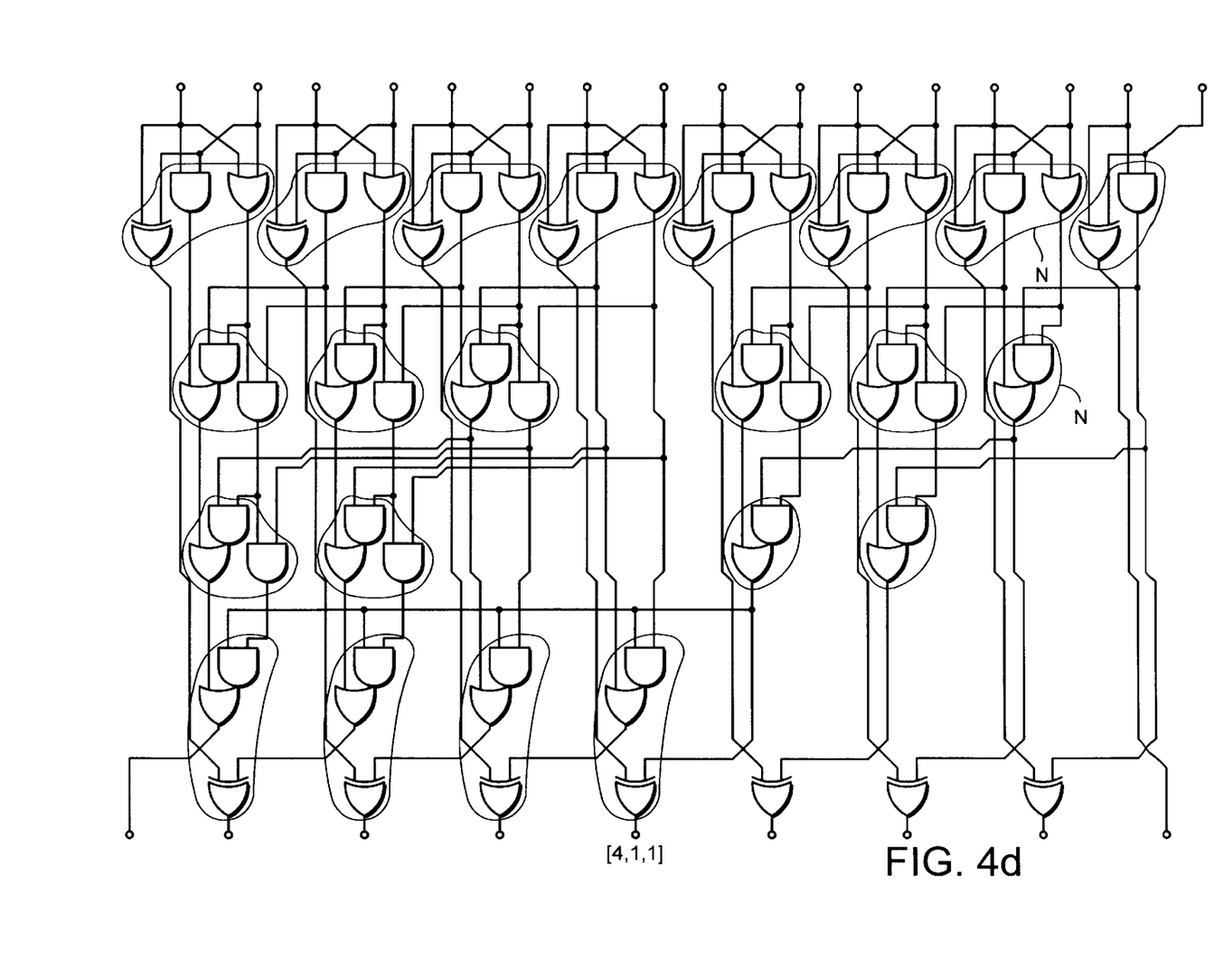

FIGS. 4b, 4c and 4d represent the circuit implementations of the node diagrams of FIGS. 3b, 3c and 3d respectively. In each of these circuit diagrams, the nodes marked N correspond to the nodes N illustrated by black dots connected by black lines in FIGS. 3b, 3c and 3d. The black dots in the node array diagrams of FIGS. 3b, 3c and 3d which are not connected by black lines do not of course find an equivalent in the circuit diagrams of FIGS. 4b, 4c and 4d. The configuration of logic gates for each node can be selected from those illustrated in the circuit of FIG. 2, depending on the number of input signals required to be combined at the node and whether these have come from a spanning path or an addition path of the same bit significance.

The principles of the invention can be readily extended to addition circuits for adding binary numbers of different lengths. The invention also applies to so-called minimum-depth addition circuits, where the number of stages in the addition circuit is determined according to the following criteria:

for bit lengths n of a binary order, the number m+2 of logical stages is derived from the following equation:

$n=2^{m+1}$, and for bit lengths n which are not binary orders, the number m+2 of logical stages is derived from the following equation: $n_{b0}=2^{m+1}$ where $n_{b0}$ is the next largest binary order after n.

Figure 5A:
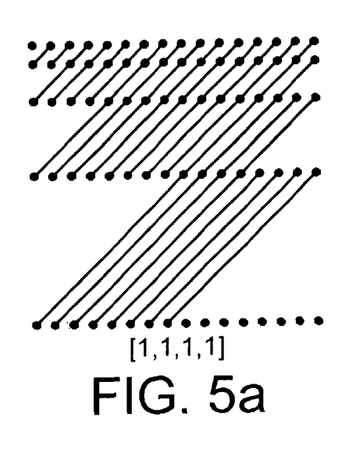
FIGS. 5a through 5n are node diagrams for addition circuits where n=16.
Figure 5B:
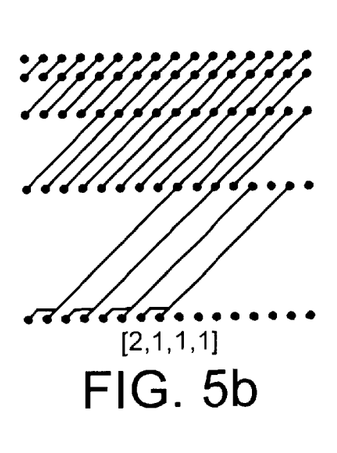
Figure 5C:
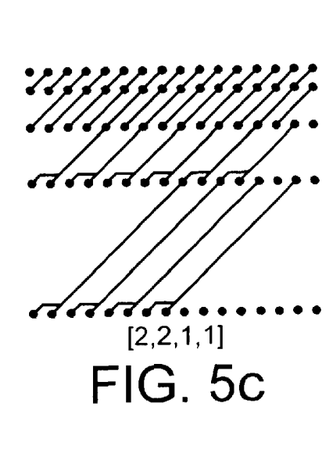
Figure 5D:
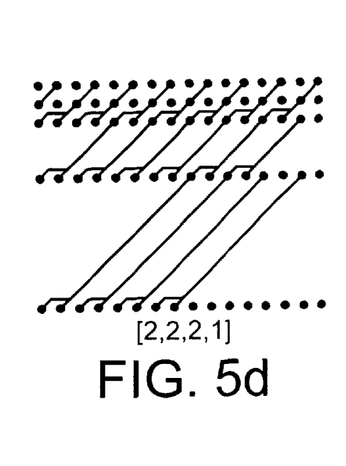
Figure 5E:
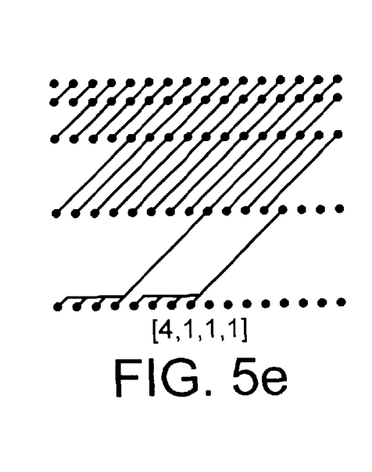
Figure 5F:
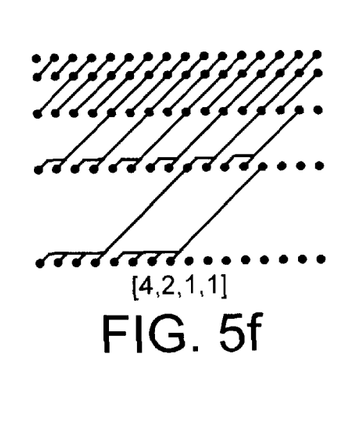
Figure 5G:
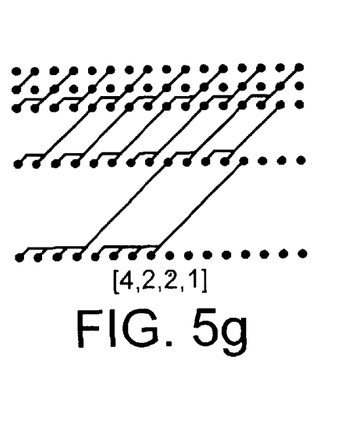
Figure 5H:
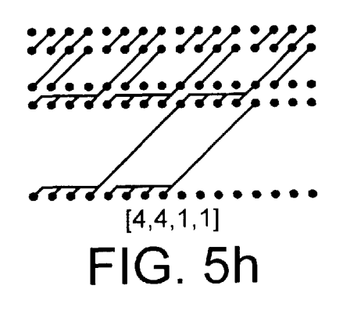
Figure 5I:
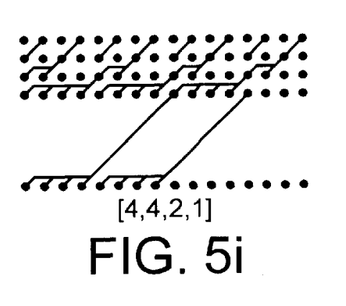
Figure 5J:
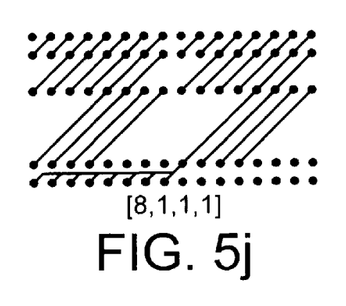
Figure 5K:
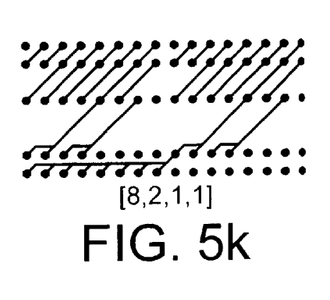
Figure 5L:
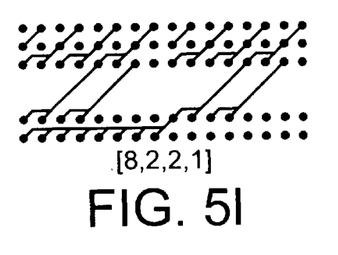
Figure 5M:
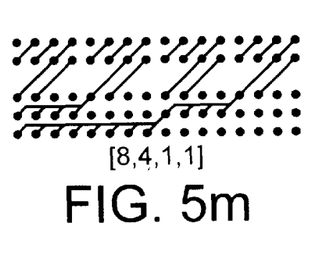
Figure 5N:
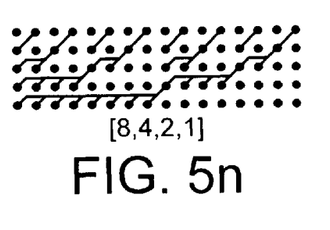

As will be apparent, in the preceding example m=2, the number of interconnection levels (index j) is m+1=3 and the number of logical stages (index k) is m+2=4. FIGS. 5a to 5n illustrate possible addition circuits where n=16 and m=3. FIGS. 5b to 5m represent circuits in accordance with embodiments of the invention, that is circuits which follow the configuration parameters discussed above.

In designing an addition circuit using the node array diagrams illustrated in FIGS. 3 and 5 and conforming to the above-mentioned criteria, it will be appreciated that those zones that are empty of spanning paths can be quickly identified. Of course, it is not necessary to implement a logical node with logic circuitry where it is not connected to any other node.

A method of designing an addition circuit will now be described. The binary length n of the numbers to be added is first specified. Then, the number of logical stages in the addition circuit is determined according to the above-defined criteria for a minimum-depth addition circuit. The required output drive strength of the addition circuit is established, and this defines the size of the logic gates requires to implement the nodes of the final stage. The size of the logic gates used to implement the nodes of the final stage determines the input capacitance of that stage. At this point, the design options available according to the configuration parameters of the present invention can be considered to provide a number of different options for the addition circuit. For each option or a selected group of these options, the capacitance of the spanning paths in the interconnection level to the final stage can be calculated. The choice of a spanning configuration in terms of the number of wires versus the extent of fan-out determines the size of logic gates at the driving level, which in turn determines the input capacitance as seen by the preceding level. Thus, a recursive design method is implemented to determine an optimum addition circuit for the application in hand.

The invention thus provides a number of different design options for addition circuits that allow a designer more freedom than has hitherto been the case in designing addition circuits.

Although representative embodiments of the invention have been illustrated and described, it will appreciated that various changes can be made therein without departing from the spirit and scope of the invention. Thus, the invention is to be limited by the scope of the claims that follow.

What is claimed is:

1. An addition circuit for adding together two binary numbers each having a length of n bits to generate a result having n bits, comprising:

an array of logical nodes that are arranged so that each set of logical nodes extending widthwise of the circuit form a logical stage and each set of nodes extending depthwise of the circuits forms an addition path, with each pair of adjacent addition paths forming a column, each addition path having inputs for receiving respective bits of the binary numbers of equal significance and outputs for generating respective output bits of the result;

spanning paths arranged to interconnect selected logical nodes so that adjacent logical stages are connected via an interconnection level, each spanning path extending from a node in one stage across at least one column being connected to a number f of fan-out nodes in a subsequent stage, the circuit having the following configuration parameters:

i) for each interconnection level the number f of fan-out nodes lies in the range 1 to $2^j$, where j is the interconnection level index lying between 0 and m, $2^j$ is the maximum fan-out number for that level, and there are m+2 logical stages;

ii) the fan-out f of nodes at each level is always no greater than the number f of fan-out nodes at a subsequent level;

iii) the number of columns across which a spanning path extends within an interconnection level is $2^j$; and at least one level has a fan-out number $f<2^j$ and at least one level has a fan-out number $f>1$.

2. An addition circuit as claimed in claim 1 wherein for bit lengths n of a binary order the number (m+2) of logical stages is derived from the following equation:

$n=2^{m+1}$.

3. An addition circuit according to claim 1 wherein for bit lengths n which are not binary orders, the number (m+2) of logical stages is derived from the following equation:

$$n_{b0}=2^{m+1}$$

where $n_{b0}$ is the next largest binary order after n.

4. An addition circuit according to claim 1 wherein each logical node receives at least two signals representing bits of the same significance (i) in the binary numbers to be added, and comprises at least one logic gate.

5. An addition circuit according to claim 1 wherein each spanning path conveys one or more signals from a node of one significance in one logical stage to a node of a different significance in a subsequent logical stage.

6. An addition circuit according to claim 1 wherein the fan-out f=1 for more than one level.

7. An addition circuit according to claim 6 wherein f=1 for all levels except the mth level.

8. An addition circuit according to claim 1 wherein at least one level has maximum fan-out ($f=2^j$) where j=m.

9. An addition circuit according to claim 1 where the fan-out f=2 for at least two levels.

10. An addition circuit for an integrated circuit, comprising:
- a plurality of nodes, the nodes arranged in rows and columns, each row forming a logical stage, and each column formed of two adjacent addition paths, each addition path having inputs for receiving respective input bits and outputs for generating respective output bits;
- a plurality of spanning paths connecting nodes in one column with nodes in one or more adjacent columns and in one or more subsequent stages, the spanning paths comprising metal lines arranged to interconnect selected nodes so that the adjacent logical stages are connected via an interconnection level, the circuit comprising the following configuration parameters:
  - i) for each interconnection level the number f of fan-out nodes lies in the range of 1 to $2^j$, where j is the interconnection level index lying between 0 and m, $2^j$ is the maximum fan-out number for that level, and there are m+2 logical stages;
  - ii) the fan-out f of nodes at each level is always no greater than the number f of fan-out nodes at a subsequent level;
  - iii) the number of columns across which a spanning path extends within an interconnection level is $2^j$; and at least one level has a fan-out number $f<2^j$ and at least one level has a fan-out number f>1; and for bit lengths n of a binary order, the number (m+2) of logical stages comprises $n=2^{(m+1)}$.

11. The circuit of claim 10 wherein the number (m+1) of stages further comprises:

for bit lengths n that are not binary orders, $n_{b0}=2^{m+1}$.

12. An addition circuit for adding together two binary numbers each having a length of n bits to generate a result having n bits, comprising:
- an array of logical nodes that are arranged so that each set of logical nodes extending widthwise of the circuit form a logical stage and each set of nodes extending depthwise of the circuits forms an addition path, with each pair of adjacent addition paths forming a column each addition path having inputs for receiving respective bits of the binary numbers of equal significance and outputs for generating respective output bits of the result;
- spanning paths arranged to interconnect selected logical nodes so that adjacent logical stages are connected via an interconnection level, each spanning path extending from a node in one stage across at least one column being connected to a number f of fan-out nodes in a subsequent stage, the circuit having the following configuration parameters:
  - i) for each interconnection level except the mth, the number f of fan-out nodes is 1, and for the mth level, the fan-out number f=1 lies in the range 2 to $2^m$ and there are m+2 logical stages;
  - ii) the fan-out f of nodes at each level is always no greater than the number f of fan-out nodes at a subsequent level; and
  - iii) the number of columns across which a spanning path extends within an interconnection level is $2^j$, where j is the interconnection level index lying between 0 and m.

13. An addition circuit for adding together two binary numbers each having a length of n bits to generate a result having n bits, comprising:
- an array of logical nodes that are arranged so that each set of logical nodes extending widthwise of the circuit form a logical stage and each set of nodes extending depthwise of the circuits forms an addition path, with each pair of adjacent addition paths forming a column each addition path having inputs for receiving respective bits of the binary numbers of equal significance and outputs for generating respective output bits of the result;
- spanning paths arranged to interconnect selected logical nodes so that adjacent logical stages are connected via an interconnection level, each spanning path extending from a node in one stage across at least one column being connected to a number f of fan-out nodes in a subsequent stage, the circuit having the following configuration parameters:
  - i) for each interconnection level the number f of fan-out nodes lies in the range 1 to $2^j$, where j is the interconnection level index lying between 0 and m, $2^j$ is the maximum fan-out number for that level, and there are m+2 logical stages;
  - ii) the fan-out f of nodes at each level is always no greater than the number f of fan-out nodes at a subsequent level;
  - iii) the number of columns across which a spanning path extends within an interconnection level is $2^j$; and
    - at least one level has a fan-out number $f<2^j$ and at least one level has maximum fan-out $f=2^j$, where j=m.

14. An addition circuit for adding together two binary numbers each having a length of n bits to generate a result having n bits, comprising:
- an array of logical nodes that are arranged so that each set of logical nodes extending widthwise of the circuit form a logical stage and each set of nodes extending depthwise of the circuits forms an addition path, with each pair of adjacent addition paths forming a column each addition path having inputs for receiving respective bits of the binary numbers of equal significance and outputs for generating respective output bits of the result;

spanning paths arranged to interconnect selected logical nodes so that adjacent logical stages are connected via an interconnection level, each spanning path extending from a node in one stage across at least one column being connected to a number f of fan-out nodes in a subsequent stage, the circuit having the following configuration parameters:

i) for each interconnection level the number f of fan-out nodes lies in the range 1 to $2^j$, where j is the interconnection level index lying between 0 and m, $2^j$ is the maximum fan-out number for that level, and there are m+2 logical stages;

ii) the fan-out f of nodes at each level is always no greater than the number f of fan-out nodes at a subsequent level;

iii) the number of columns across which a spanning path extends within an interconnection level is $2^j$; and at least two levels have a fan-out number f=2.

* * * * *